(12) United States Patent
Fütterer et al.

(10) Patent No.: US 8,498,371 B2
(45) Date of Patent: Jul. 30, 2013

(54) HEAD-END PROCESS FOR THE REPROCESSING OF REACTOR CORE MATERIAL

(75) Inventors: Michael A. Fütterer, Bergen (NL); Peter Hoppe, Stutensee (DE); Josef Singer, Eggenstein-Leopoldshafen (DE); Bluhm Hansjoachim, Stutensee (DE)

(73) Assignee: The European Atomic Energy Community (Euratom), Represented by the European Commission (BE)

( * ) Notice: Subject to any disclaimer, the term of this patent is extended or adjusted under 35 U.S.C. 154(b) by 1390 days.

(21) Appl. No.: 11/816,461

(22) PCT Filed: Feb. 16, 2006

(86) PCT No.: PCT/EP2006/060017
§ 371 (c)(1),
(2), (4) Date: Dec. 6, 2007

(87) PCT Pub. No.: WO2006/087360
PCT Pub. Date: Aug. 24, 2006

(65) Prior Publication Data
US 2008/0159464 A1 Jul. 3, 2008

(30) Foreign Application Priority Data
Mar. 25, 2005 (LU) .......................... 91158

(51) Int. Cl.
*G21C 19/42* (2006.01)
(52) U.S. Cl.
USPC .......................... 376/311; 376/308
(58) Field of Classification Search
USPC .......................... 376/430, 431, 455
See application file for complete search history.

(56) References Cited

U.S. PATENT DOCUMENTS

| | | | | |
|---|---|---|---|---|
| 3,322,500 | A * | 5/1967 | Sternberg | 422/89 |
| 3,669,832 | A * | 6/1972 | Boettcher | 376/421 |
| 4,323,198 | A * | 4/1982 | Turner et al. | 241/5 |

FOREIGN PATENT DOCUMENTS

| | | | |
|---|---|---|---|
| CA | 2104414 A1 * | 8/1993 | |
| CA | 2104414 | 2/1995 | |

OTHER PUBLICATIONS

Del Cul et al.; "TRISO-Coated Fuel Processing to SUpport High-Temperature Gas-Cooling Reactors", ORNL report, Sep. 2002.*
Del Cul et al., "TRISO-Coated Fuel Processing to Support High-Temperature Gas-Cooling Reactors," ORNL report, Sep. 2002.*
Masson, Michel, et al., "HTGR spent fuels processing: The CEA investigation program" 2nd International Topical Meeting on High Temperature Reactor Technology, Sep. 22, 2004, pp. 1-9 XP002378606.*
Bluhm, H. et al., "Application of Pulsed HV Discharges to Material Fragmentation and Recycling." IEE Transactions on Dielectrics and Electrical Insulation IEEE USA, vol. 7, No. 5, Oct. 2000, pp. 626-636 XP002378607, ISSN: 1070-9878.*
Database WPI, Section CH, Week 200512, Derwent Publications Ltd., London GB; AN 2005-109782; XP002381172.*

(Continued)

*Primary Examiner* — Jack W Keith
*Assistant Examiner* — Sean P Burke
(74) *Attorney, Agent, or Firm* — Cantor Colburn LLP

(57) ABSTRACT

In a head-end process for the reprocessing of reactor core material with embedded fuel particles, reactor core material is arranged in a reactor containing a fluid. The reactor comprises a voltage discharge installation in the fluid. Voltage discharges are applied through the fluid for fragmenting the fuel particles into fragmentation products and the fragmentation products are segregated.

19 Claims, 4 Drawing Sheets

OTHER PUBLICATIONS

International Search Report: PCT/EP2006/060017; Jun. 12, 2006.*
Masson Michel, Grandjean Stephane: "HTGR spent fuels processing: The CEA investigation program" 2nd International Topical Meeting on High Temperature Reactor Techology, Sep. 22, 2004, pp. 1-9, XP002378606.
Bluhm H et al: "Application of pulsed HV discharges to material fragmentation and recycling" IEE Transactions on Dielectrics and Electrical Insulation IEEE USA, vol. 7, No. 5, Oct. 2000, pp. 625-636, XP002378607; ISSN: 1070-9878.
International Search Report; PCT/EP2006/060017; Jun. 12, 2006.

* cited by examiner

Fig. 4
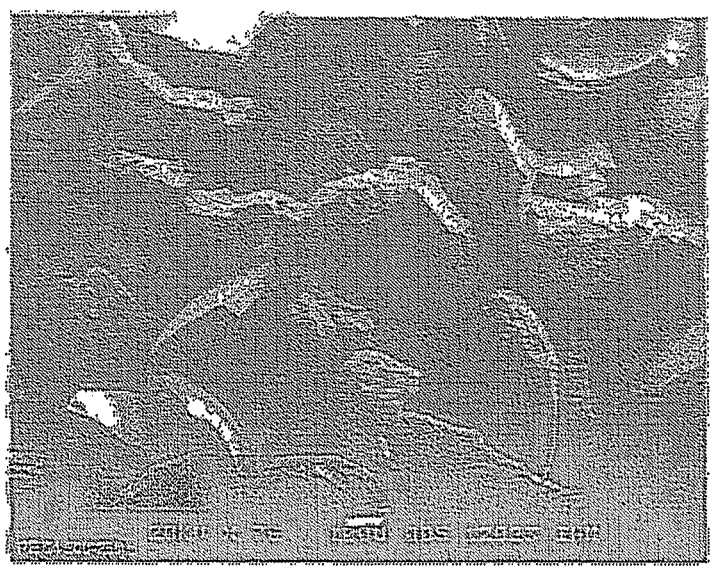
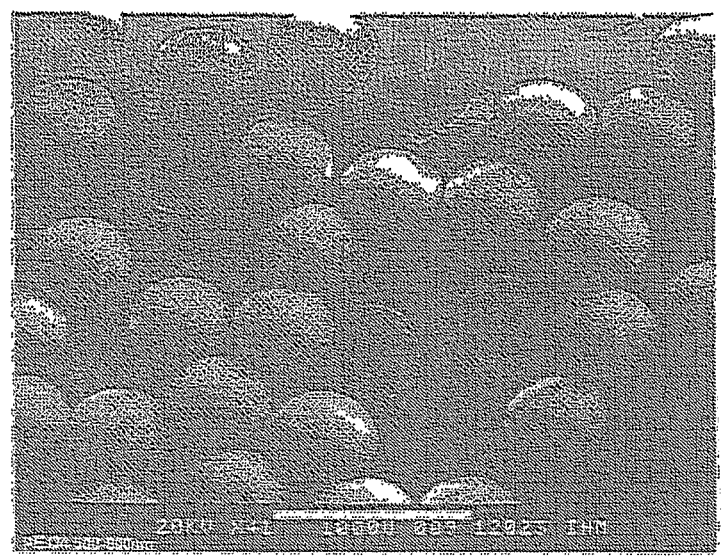
Fig. 5

HEAD-END PROCESS FOR THE REPROCESSING OF REACTOR CORE MATERIAL

CROSS-REFERENCE TO RELATED APPLICATIONS

This application is related to and claims the benefit of U.S. Provisional Patent Application Ser. No. 60/653,400 filed on 16, Feb. 2005, the entire contents of which are herein incorporated by reference. This application is also related to and claims the benefit of Luxembourg Patent Application Ser. No. 91 158 filed on 25 Mar. 2005, the entire contents of which are herein incorporated by reference.

TECHNICAL FIELD OF THE INVENTION

The invention provides a head-end process for the reprocessing of reactor core material, which is suitable for a hot cell environment and industrially relevant material streams.

The present invention relates to a head-end process for the reprocessing of reactor core material, more particularly to the fragmenting of coated fuel particles and nuclear fuel elements comprising coated fuel particles embedded in a matrix material.

BACKGROUND OF THE INVENTION

The reprocessing of coated particle fuel e.g. from high temperature gas-cooled reactors (HTGR) is useful in many cases to maximize the use of the fuel. It is even mandatory for the U-Pu (fast reactor) and for the Th-U fuel cycle as well as for the incineration of minor actinides in these reactors.

Coated fuel particles are characterized by their high resistance against mechanical impact and chemical attack, which makes them safe, rather proliferation-resistant and suitable for direct disposal, yet difficult to reprocess.

For use in a reactor, the fuel particles are generally embedded in the matrix material (e.g. graphite, carbide or ceramic) of a fuel element. About 10 000 fuel particles are e.g. contained in a spherical fuel element (pebble) of type AVR GLE-4, fabricated by NUKEM for the German High Temperature Reactor (HTR). The following table summarises the nominal characteristics of AVR GLE-4 pebbles and the embedded particles.

| Coated Fuel Particle | |
| --- | --- |
| Particle batch | HT 354-383 |
| Kernel composition | $UO_2$ |
| Kernel diameter [µm] | 501 |
| Enrichment [U-235 wt. %] | 16.75 |
| Thickness of coatings [µm]: | |
| buffer | 92 |
| inner PyC | 38 |
| SiC | 33 |
| outer PyC | 41 |
| Particle diameter [µm] | 909 |
| Pebble | |
| Heavy metal loading [g/pebble] | 6.0 |
| U-235 contents [g/pebble] | 1.00 ± 1% |
| Number of coated particles per pebble | 9560 |
| Volume packing fraction [%] | 6.2 |
| Defective SiC layers [$U/U_{tot}$] | $7.8 \times 10^{-6}$ |
| Matrix graphite grade | A3-3 |
| Matrix density [kg/m$^3$] | 1750 |
| Temperature at final heat treatment [° C.] | 1900 |

For the reprocessing of coated fuel particles, i.e. the fuel kernel with multiple ceramic coatings, or fuel elements containing such fuel particles, one option is to isolate these particles from the matrix material (e.g. graphite) of the fuel elements, which may have the shape of spheres, rods, plates or other. Then the coatings of the fuel particles must be cracked to make the fuel kernel accessible to chemical reprocessing. Another option is to fragment the fuel elements and the coated particles together. A direct dissolution of the fuel element or of the coated particles is currently considered extremely difficult as in particular the often used SiC coating is resistant against dissolution in common nitric acid solutions. A mechanical cracking of the coatings is equally problematic due to the high mechanical resistance of the coatings and their questionable suitability for use in a hot cell environment.

In "An Overview of HTGR Fuel Cycle", Report ORNL-TM-4747, 1976, K. J. Notz describes examples of mechanical fracturing applied to ceramic nuclear fuel, such as grinding by hammers (coal mill type) or grinding between disks (wheat mill type). U.S. Pat. No. 4,323,198 discloses the fragmentation by sandblasting against a hard surface for the reprocessing of nuclear particle fuel.

The known mechanical methods however suffer from several shortcomings:
- low efficiency and high energy consumption;
- potential use of pressurized gases as in the case of sandblasting;
- production of toxic or explosive dust causing safety problems;
- high noise level and vibrations;
- pollution of the matter to be fragmented by non-negligible quantities of abrasion products;
- high wear and tear of the impact material by abrasion, limited lifetime, high investment and operation costs.

It can thus be concluded that mechanical methods are rather unsuited for use in hot cell environment as they are e.g. not compatible with the safety standards of the latter. High overall costs inhibits the industrial applicability of the mechanical methods.

In "The Reprocessing Issue for HTR Spent Fuels", Proc ICAPP'04, Grenéche et al. discuss the pulsed high voltage discharge technique for separating coated particles from their graphite matrix. Experimental results show that graphite can be fragmented, and that the grain size distribution is a function of the number of applied pulses. The high voltage technique is known e.g. from Bluhm et al. "Application of HV Discharges to Material Fragmentation and Recycling", IEEE Transactions on Dielectrics and Electrical Insulation, Vol. 7 No. 5, 2000.

The cracking of coated fuel particles for reprocessing is, however, considered a so far unresolved problem.

Furthermore, when nuclear reactors of certain types (e.g. block-type reactors) are loaded, the fuel elements comprising the fuel particles are inserted into a support material of the reactor core. The support material depends on the reactor type and may e.g. comprise graphite, carbide or nitride. After operation, the extraction of the fuel elements and the radioactive material is difficult, because during operation of the nuclear reactor, the support material and the fuel elements may be subject to deformations. The fuel elements can be literally stuck in the surrounding support material.

Traditional methods for recovering the used nuclear fuel suffer from the disadvantage that the separation of the materials is not complete and that the support material remains contaminated with the nuclear fuel. Recycling of the support material thus is difficult.

SUMMARY OF THE INVENTION

It is an object of the present invention to provide a head-end process for the reprocessing of reactor core material, which is suitable for a hot cell environment and industrially relevant material streams.

In a head-end process for the reprocessing of reactor core material comprising fuel particles, reactor core material is arranged in a reactor containing a fluid (e.g. water). The reactor comprises a voltage discharge installation in the fluid. Voltage discharges are applied through the fluid for fragmenting the fuel particles into fragmentation products and the fragmentation products are segregated.

According to the invention, the fuel particles are fractured by applying voltage discharges through the fluid contained in a reactor. The process is energy-efficient and power consumption is relatively low. The process does not suffer from the shortcomings of the mechanical methods discussed above, which makes it suitable for a hot cell environment with industrially relevant quantities. After fragmentation of the fuel particles, the fragmentation products can be directly fed into classical aqueous reprocessing. At the moment of introducing the fuel particles into the reactor, the fuel particles can be comprised in said reactor core material.

The head-end process proposed is particularly well suited for fuel particles, which comprise each a fuel kernel and several coatings enclosing the fuel kernel. By application of voltage discharges, the coatings of the fuel particles are fragmented.

In a preferred embodiment of the invention, the reactor core material further comprises matrix material, which are embedded in the matrix material; both the matrix material and the coatings may be fragmented by the application of voltage discharges. If necessary, the reactor core material is cut or pre-fragmented so that the pieces fed into the reactor have a suitable size, typically of the order of a few centimeters. The fragmentation of the matrix material and the coatings may be achieved in separate process steps. Alternatively, the fragmentation of the matrix material and the coating may be achieved in a single step. The matrix material may comprise the support material of the reactor core and the fuel element material, in which the fuel particles are embedded.

As will be appreciated, the reactor core material with the fuel elements carrying the fuel particles can be fed into the present head-end process. Hence, there is no need for removing the nuclear fuel elements from the support material prior to fragmentation. The separation of the fuel kernel material and the matrix material of the support material and the fuel element can be achieved after the fragmentation by voltage discharges. The amount of fuel kernel material remaining in the matrix material is lower, which facilitates the recycling of the latter and thus potentially saves resources.

The matrix material (e.g. graphite, nitride, carbide or other ceramic material) can also be further fragmented to facilitate decontamination and to obtain a powder as the starting product for possible re-fabrication of fuel, moderator or reflector. The matrix material, contaminated after its use, would consume excessive storage space if disposed of directly. Also, graphite of sufficient quality is a scarce resource, in particular when considering the possible deployment of a relatively large number of HTGRs worldwide.

The segregation of the fragmentation products, e.g. coating shells, matrix material and/or fuel kernels can be achieved in any suited process step, like dissolving the fuel kernels or sieving. Sieving can e.g. comprise several sieving steps with sieves of different hole sizes. If the fuel kernel is to be dissolved e.g. in nitric acid, the coatings need not to be completely removed from the fuel kernels: it is sufficient that a crack in the coatings allows the acid to penetrate to the fuel kernel.

According to a preferred embodiment of the invention, it is proposed a head-end process for the reprocessing of reactor core material wherein the reactor core material is arranged in a reactor containing a first volume of a fluid, the reactor being provided with a voltage discharge installation in the fluid. First voltage discharges are applied through the first volume of fluid so as to primarily fragment the matrix material. The so-obtained fragmentation products are segregated so as to retrieve residua fragments containing the nuclear fuel kernels and possibly some residual matrix material The residual fragments are arranged in the same or another reactor containing a second volume of fluid and second voltage discharges are applied through the second volume of fluid so as to fragment the coatings and the residual matrix material contained in the residual fragments. After fragmentation, the fuel kernels are segregated from the coatings and/or the residua matrix material.

The electric parameters for applying the first and the second voltage discharges can be adapted so that in the first fragmentation step mainly matrix material is fragmented, while in the second fragmentation step the coatings of the fuel particles are cracked. The electric power can be chosen significantly higher in the second fragmentation step in order to achieve an increased power density in the liquid. Alternatively or additionally, the second volume can be chosen substantially smaller than the first volume, which also leads to an increased power density. Preferably the applied voltage ranges from 40 to 400 kV.

At least one of the segregation steps preferentially comprises sieving and/or dissolving the fuel kernels. The first segregation step may comprise sieving with a sieve having holes, the size of which may e.g. be comprised between 0.7 and 0.95 times the fuel particle diameter. Alternatively, the hole size may e.g. be comprised between 0.7 and 0.95 times the fuel kernel diameter. If a sieve is used in the second segregation step, the holes have preferably a width comprised between 0.7 and 0.95 times the fuel kernel diameter.

In practice, the reactor core material is advantageously arranged on a sieve or in a closed cup in the reactor, and the voltage discharges are caused by applying potential differences between two electrodes arranged in said reactor. One of the electrodes may be the sieve, resp. the closed cup. One of the electrodes may be grounded. If a sieve is used in the first fragmentation step, one may use a sieve with a hole size comprised between 2 and 4 times the size of the fuel particles and more preferably a sieve with a hole size corresponding to approximately 3 times the diameter of the fuel particles.

It may furthermore prove useful if the electrode plunges into the reactor core material, fuel element pieces, fuel particles, or residual fragments.

BRIEF DESCRIPTIONS OF THE DRAWINGS

FIG. 4 is an illustration of fractured coating shells of fuel particles;

FIG. 5 is an illustration of fuel kernels separated from their coatings;

DETAILED DESCRIPTION OF PREFERRED EMBODIMENT OF THE INVENTION

The invention will be more apparent from the following description of not limiting embodiments with reference to the above-mentioned drawings.

Figure 1:
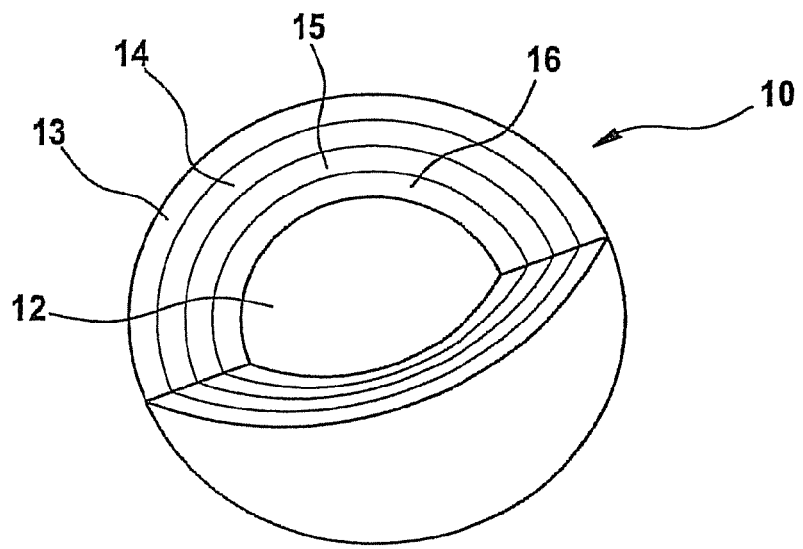
FIG. 1 is a schematic of a coated fuel particle.

FIG. 1 shows the structure of a fuel particle 10. Without prejudice to the general concepts of the invention, we will assume in the following that the nuclear fuel (Uranium, Plutonium, Thorium, minor actinides or mixtures of them) is present as ceramic kernel 12 in spherical shape with a diameter of approximately 0.5 mm. This fuel kernel 12 is covered with several successive coating layers: an inner carbon buffer layer 13, a pyrolytic carbon layer 14, a silicon-carbide layer 15 and an outer pyrolytic carbon layer 16. The fuel kernel forms, together with the coatings the fuel particle 10 with a typical diameter of approximately 1 mm. Thousands of these particles are contained in the matrix (made e.g. from graphite, carbide, or other ceramics) of a fuel element, which may have any suitable form, such as e.g. spherical, cylindrical or other.

The process enables the separation of the fuel particles from their matrix material with the consecutive fragmentation or complete removal of the coatings to make the fuel kernel accessible to chemical dissolution for further reprocessing. The process can be used for fully separating the coatings and the matrix material from the kernels. This separation of kernels and coatings, however, is not even mandatory if the nuclear fuel of the kernels is chemically dissolved, so that a large fracture in the coating is deemed sufficient for this purpose.

Figure 2:
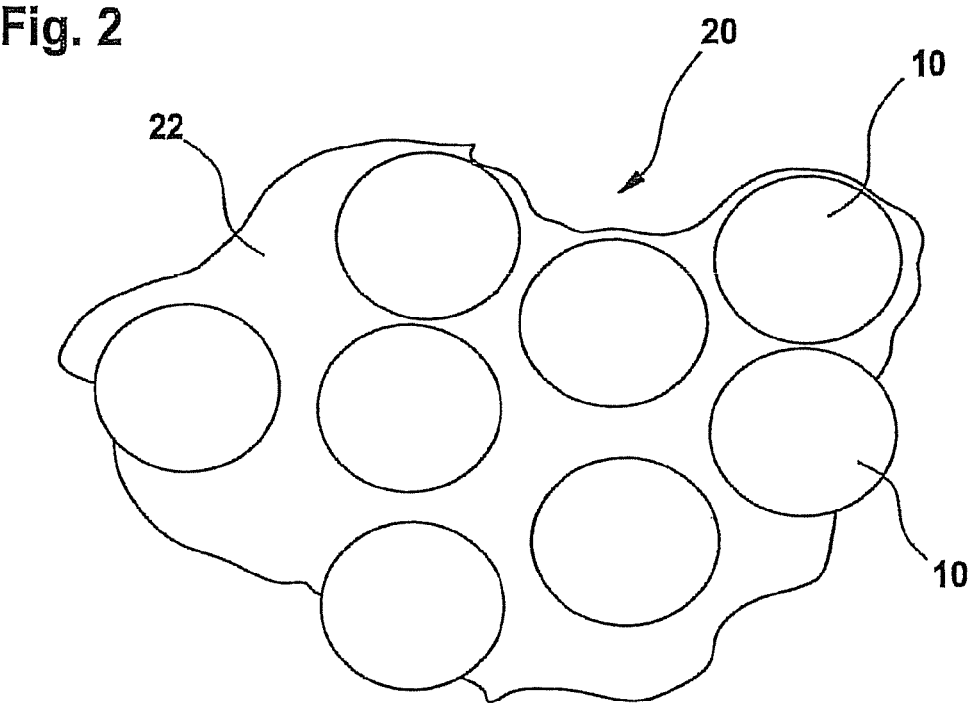
FIG. 2 is an illustration of a fragment of reactor core material with coated fuel particles embedded in matrix material.

FIG. 2 shows an illustration of a small fragment 20 of a nuclear fuel element. Fuel particles 10 are embedded in a matrix material 22.

If necessary, the fuel elements are mechanically cut or fragmented into pieces such that the dimensions of these primary fragments are such that the latter can be easily manipulated and fed into the subsequent process steps. Dimensions of the order of several centimeters may be convenient for the purpose of the invention. The embedded fuel particles themselves remain undamaged thanks to their high mechanical resistance.

Figure 3:
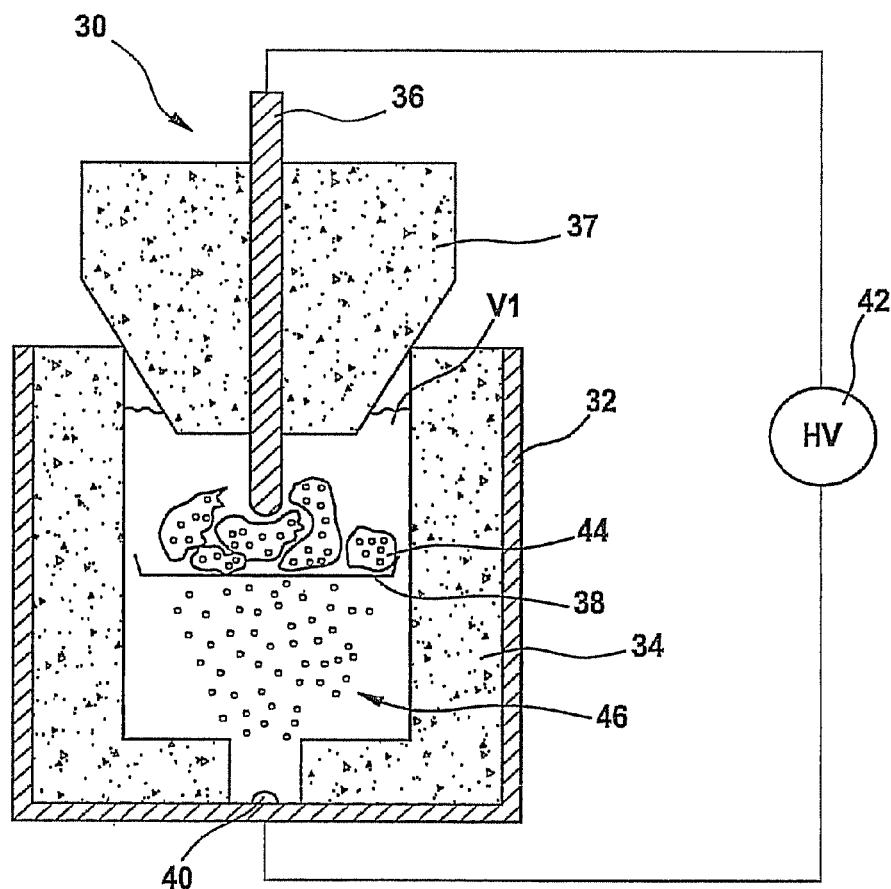
FIG. 3 is an illustration of the fragmenting of fuel elements with high voltage discharges.
Figure 6A:
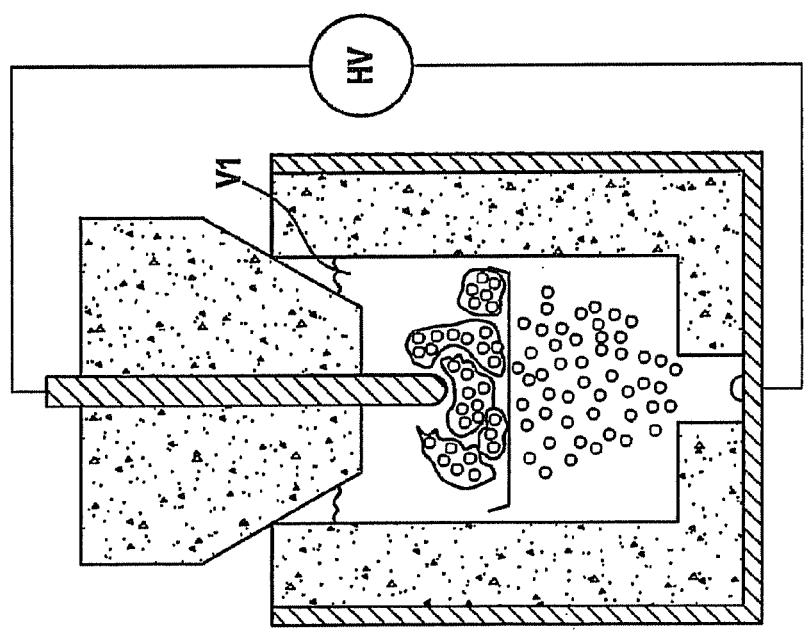
FIG. 6a is an illustration of a first reactor containing a first Volume V1.
Figure 6B:
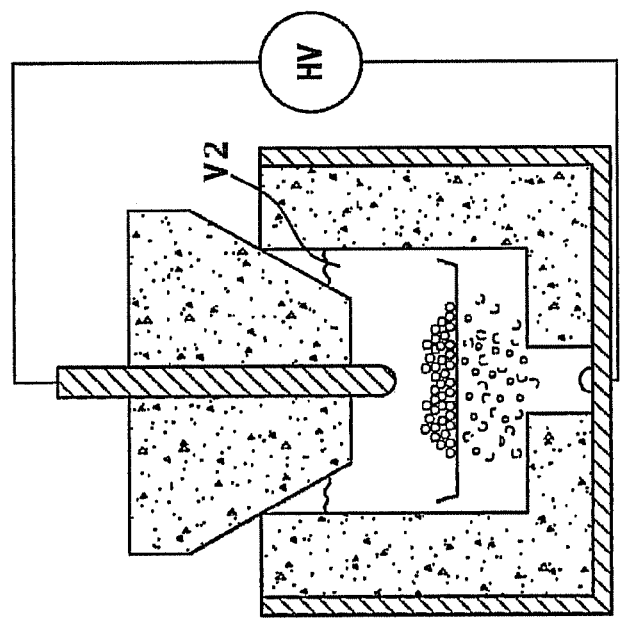
FIG. 6b is an illustration of a second reactor containing a second Volume V2.

The fuel element pieces are brought into a reactor 30 filled with a volume V1 of water. The reactor vessel shown in FIG. 3 comprises a steel container 32, the inner wall of which is lined with an electric insulator 34 (e.g. plastic). A massive-steel high voltage electrode 36 is arranged in an electrically insulating cover block 37 and plunges into the water. A sieve 38 is located in the middle of the volume V1. A second electrode 40 is arranged at the bottom of the reactor an is electrically insulated from the steel container 32. The holes of the sieve 38 have a diameter of approximately three times the fuel particle diameter, in this case 3 mm. A pulse generator 42 periodically charges the top electrode 36 with voltages of 40-400 kV with respect to the bottom electrode 40. The distance between the high voltage electrode 36 and the sieve 38 is chosen such that the top electrode 36 has a suitable distance from the fragments 44 (e.g. of the order of one or several centimeters) and that discharges through the water are obtained. The discharges cause electro-hydraulic shock waves in the water, which fragment the matrix graphite. The maximum discharge currents are of the order of 10 kA. By correctly choosing the volume V1, damage to the fuel particles 10 can be avoided with these electric discharge parameters. For energy-optimised fragmentation, the diameter of the holes in the sieve 38 is adapted to the size of the fuel particles. If the holes are too large, the fuel particles remain in the matrix material, if they are too small, the matrix material will be fragmented to unnecessarily fine grains before falling through the holes of the sieve 38. The maximum of the statistical fragment size distribution is approximately 1.5 mm. If holes of 3 mm are selected, the fuel particles can thus be separated from the matrix in the material fraction 46, which has fully passed the sieve. The fuel particles, which have dropped through the sieve are contained in the sieve fraction containing the fragments with a minimal size of 1 mm.

The quantity of material to be processed in further steps can be reduced by segregating out a fraction of the matrix material. This can be done by sieving the fragments obtained in the preceding step. The quantity of removed matrix material depends on the size of the holes in the sieve: if the hole diameter is only slightly smaller than the fuel particles, the residual material to treat further mainly comprises fuel particles; if the hole diameter is chosen substantially smaller than the fuel particles the fraction of residual matrix material is larger. If one chooses the hole diameter slightly smaller than the fuel kernel, one assures that possible cracked fuel particles are subject to further treatment.

In a subsequent process step the residual fragments of the preceding step are treated with high voltage discharges in a liquid-containing reactor in order to crack the coatings of the fuel particles. There are two options:

high voltage discharges over a closed cup or
high voltage discharges over a sieve with a hole diameter slightly smaller than the fuel kernels (here 0.4 mm).

The electric parameters can be identical to those mentioned above, the reaction volume V2 is however significantly smaller than the first volume V1. The electrode can plunge into the material fragments to be treated. The volume reduction yields an increased power density of the created shock waves, which make the coatings burst and which may remove them from the fuel kernel. Contrary to the oxide kernel, the coating shells and possibly residual matrix material are further fragmented. Once coatings and matrix material are sufficiently fragmented, they will drop through the sieve, or, when a closed cup is used, the fragmentation products can be sieved in a consecutive step.

FIG. 4 shows a picture of separated coating shells and FIG. 5 shows fuel kernels together with their fragmented coating shells.

Another option would be to dissolve the fragmentation products collected in a closed cup directly in nitric acid to maximize the recovery of nuclear material including the fraction that may have penetrated into the coating shells.

It will be appreciated that fragmentation by voltage discharges can also be used for coated fuel particles, which are not embedded in matrix material. In this case, the fuel particles are arranged in a reactor containing a fluid or liquid (e.g. water), either on a sieve or in a closed cup.

If a sieve is used, the latter preferentially has holes with a diameter slightly smaller than the diameter of the fuel kernels. Voltage discharges are provoked by application of high voltage pulses between the sieve and an electrode arranged in the reactor. The electrode may plunge into the fuel particles. The shock waves created by the discharges make the coatings burst. Small pieces of coating material can drop through the holes of the sieve, while intact fuel kernels remain on top of the sieve.

When using a closed cup for fragmentation, high voltage pulses are applied between the cup and an electrode, which is arranged in the reactor at a suitable distance. The electrode may also plunge into the fuel particles. When the coatings are sufficiently fragmented, the fragments can be sieved to retrieve the fuel kernels and/or the fuel kernels can be dissolved, e.g. in nitric acid.

TEST EXAMPLES

Several proof-of-principle tests were performed with dummy particles. The following material was used for the experiments:

a) Coated particles: ca. 90 g with yttrium-stabilized zirconia kernel and triple coating, dummy particles obtained from the French Atomic Energy Commission CEA, Grenoble, France.

b) Several cylindrical pieces of typical commercial reactor graphite type SGL R6650.

The tests were performed in suitably modified high voltage discharge installations known e.g. from Bluhm et al. between November 2003 and April 2004. Successful results are reported in the following.

In the used laboratory equipment, the required electric energy for fragmenting the matrix graphite in the first fragmentation step was approximately 2000-5000 kWh/t depending on type and shape of the matrix graphite.

The electric energy required for the fragmentation of the coatings was approximately 8000 kWh/t.

The measured energy consumption for the tests is deemed conservative as the tests were run with laboratory installations and small amounts of material to be fragmented.

Fragmentation of Dummy Particles

Used material: 10 g dummy particles Ø1 mm.
Reaction vessel: reduced volume with polyethylene insert Ø120×15 mm, bottom reinforced. Closed cup filled with water.
Marx Generator: 7 stage 7×140 nF without additional inductivity, electrode distances 11, 12, 12, 12, 12, 12, 12 mm; charge current 120 mA at 60 kV.
Distance between electrodes: 30 mm
Number of pulses: 200
Sieve analysis of reaction product:

| particle diameter | recovered mass [g] |
| --- | --- |
| >900 µm | 0 |
| 500 | 5.65 |
| 250 | 1.42 |
| <250 | 1.75 |
| total | 8.82 (i.e. 1.18 g handling loss) |

The analysis shows that all inserted fuel particles were fragmented and that all fuel kernels have remained intact.

Fragmentation of Graphite Pieces

Used material: 3 graphite cylinders approx. Ø44×35 mm, 282 g total
Reaction vessel: Sieve bottom 3 mm, graphite cylinders symmetrically arranged around electrode.
Marx Generator: 7 stage 7×140 nF without additional inductivity, electrode distances 11, 12, 12, 12, 12, 12, 12 mm; charge current 150 mA at 60 kV.
Distance between electrodes: 50 mm
Number of pulses: 2000
After 2000 pulses, almost all of the created graphite particles had dropped through the sieve.

Fragmentation of Graphite Pieces Together with Coated Particles

This test demonstrated that representative mixtures of graphite and coated particles can be fragmented together.

Used material: graphite fragments <3 mm, 187 g (wet) with 1 g coated particles
Reaction vessel: Closed cup
Marx Generator: 7 stage 7×140 nF without additional inductivity, electrode distances 11, 12, 12, 12, 12, 12, 12 mm; charge current 150 mA at 60 kV.
Distance between electrodes: 20 mm
Number of pulses: 1600 total
Sieve analysis of reaction product:

| particle diameter | recovered mass [g] |
| --- | --- |
| >4 mm | 0 |
| 2-4 mm | 8.9 |
| 1.12-2 mm | 29.9 |
| 0.9-1.12 mm | 8.8 |
| 0.5-0.9 mm | 14.5 |
| 0.25-0.5 mm | 8.1 |
| 0.125-0.25 mm | 5.7 |
| <0.125 mm | 4.7 |

This test under not optimized conditions shows that at least a significant fraction of the coated particles can be fragmented with simultaneous presence of graphite fragments.

The invention claimed is:

1. A head-end process for the reprocessing of reactor core material comprising fuel particles, the process comprising:
arranging said reactor core material in a reactor containing a fluid, said reactor having a voltage discharge installation in said fluid;
fragmenting said fuel particles into fragmentation products by applying voltage discharges through said fluid; and
segregating said fragmentation products.

2. A head-end process according to claim 1, wherein said fuel particles comprise each a fuel kernel and coatings enclosing said fuel kernel; and wherein fragmenting of said fuel particles comprises fragmenting said coatings by said voltage discharges.

3. A head-end process according to claim 2, wherein said reactor core material further comprises matrix material, said fuel particles being embedded in said matrix material; and wherein said process comprises fragmenting said matrix material, and wherein said fragmented products comprise said fragmented matrix material.

4. A head-end process according to claim 1, wherein said segregating of said fragmentation products comprises sieving.

5. A head-end process according to claim 2, wherein said segregating of said fragmentation products comprises separating said fuel kernels from said coatings by dissolving said fuel kernels.

6. A head-end process according to claim 3, wherein said segregating of said fragmentation products comprises separating said fuel kernels from said coatings and said fragmented matrix material by dissolving said fuel kernels.

7. A head-end process according to claim 1, wherein said reactor core material is arranged on a sieve.

8. A head-end process according to claim 1, wherein said reactor core material is arranged in a closed cup.

9. A head-end process according to claim 1, wherein said reactor core material comprises fuel elements, said fuel particles being embedded in said fuel elements.

10. A head-end process according to claim 1, wherein said applying of voltage discharges comprises applying potential differences chosen in the range from 40 kV to 400 kV.

11. A head-end process for the reprocessing of reactor core material comprising matrix material and fuel particles, said fuel particles being embedded in said matrix material, each fuel particle comprising a fuel kernel and coatings enclosing said fuel kernel; said process comprising:
- arranging said reactor core material in a reactor containing a first volume of a fluid, said reactor having a voltage discharge installation in said fluid;
- applying first voltage discharges through said first volume of fluid so as to primarily fragment said matrix material, thereby obtaining fragmentation products;
- segregating said fragmentation products so as to obtain residual fragments, which contain said fuel kernels and possibly residual matrix material;
- arranging said residual fragments in a reactor containing a second volume of fluid;
- applying second voltage discharges through said second volume of fluid so as to fragment said coatings;
- segregating said fuel kernels from said coatings and the residual matrix material.

12. A head-end process according to claim 11, wherein said second volume is substantially smaller than said first volume.

13. A head-end process according to claim 11, wherein at least one of said segregation steps comprises at least one of dissolving said fuel kernels and sieving.

14. A head-end process according to claim 11, wherein said reactor core material is arranged on a sieve in said reactor, and wherein said voltage discharges are caused by applying potential differences between two electrodes arranged in said reactor.

15. A head-end process according to claim 14, wherein one of said electrodes plunges into said reactor core material.

16. A head-end process according to claim 11, wherein said reactor core material is arranged in a closed cup in said reactor, and wherein said voltage discharges are caused by applying potential differences between two electrodes arranged in said reactor.

17. A head-end process according to claim 16, wherein one of said electrodes plunges into said reactor core material.

18. A head-end process according to claim 11, wherein said matrix material, in which said fuel particles are embedded, is fuel element matrix material.

19. A head-end process according to claim 11, wherein said applying of first or second voltage discharges comprises applying potential differences chosen in the range from 40 kV to 400 kV.

* * * * *